United States Patent

[11] 3,599,579

| [72] | Inventor | Julius Barclay Estrup Paaskesen |
| --- | --- | --- |
| | | Naverland 17-19, 2600 Glostrup, Denmark |
| [21] | Appl. No. | 853,389 |
| [22] | Filed | Aug. 27, 1969 |
| [45] | Patented | Aug. 17, 1971 |
| [32] | Priority | Sept. 4, 1968 |
| [33] | | Denmark |
| [31] | | 4247/68 |

[54] APPARATUS FOR PREPARING DOUGH PIECES IN SPACED RELATIONSHIP FOR BAKING
2 Claims, 10 Drawing Figs.

[52] U.S. Cl. .................................................. 107/69,
83/107, 107/8 L, 107/15 AD
[51] Int. Cl. ..................................................... A21c 11/10,
B26d 7/06
[50] Field of Search ........................................... 83/107,
346, 347, 331; 107/4 B, 69, 8 R, 8 L, 11, 9 C, 15 A,
15 D, 54 R

[56] References Cited
UNITED STATES PATENTS

| 978,440 | 12/1910 | Eggenhofer .................. | 107/8 L |
| --- | --- | --- | --- |
| 2,525,987 | 10/1950 | Williamson ................... | 83/331 X |
| 2,892,422 | 6/1959 | Cassle ......................... | 107/69 X |
| 2,950,693 | 8/1960 | Filiti et al .................... | 107/15 A X |
| 3,120,198 | 2/1964 | Reid ............................ | 107/69 |
| 3,318,267 | 5/1967 | Artiaga et al. ................ | 107/8 R X |
| 3,448,696 | 6/1969 | Verhoeven ................... | 107/54 R X |

*Primary Examiner*—Price C. Faw, Jr.
*Attorney*—Kemon, Palmer and Estabrook

ABSTRACT: Dough pieces for baking buns or the like are punched out in polygonal, in particular hexagonal shape from a dough band advanced on a conveyor below a punching tool. The dough pieces are transferred to baking pans which are advanced below the dough band conveyor, by means of a plurality of narrow conveyors which are arranged in a fanlike configuration and driven at a higher speed than the dough band conveyor whereby the dough pieces are spaced from each other on the baking pan in the longitudinal and lateral directions thereof.

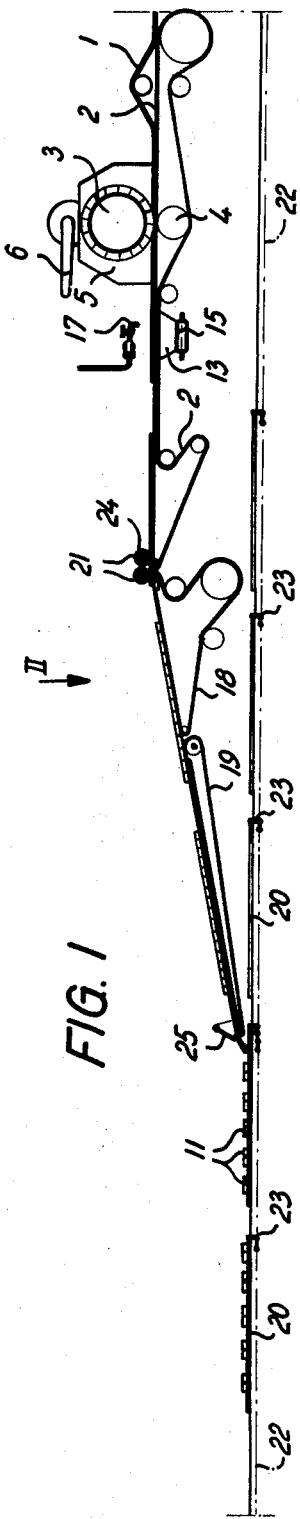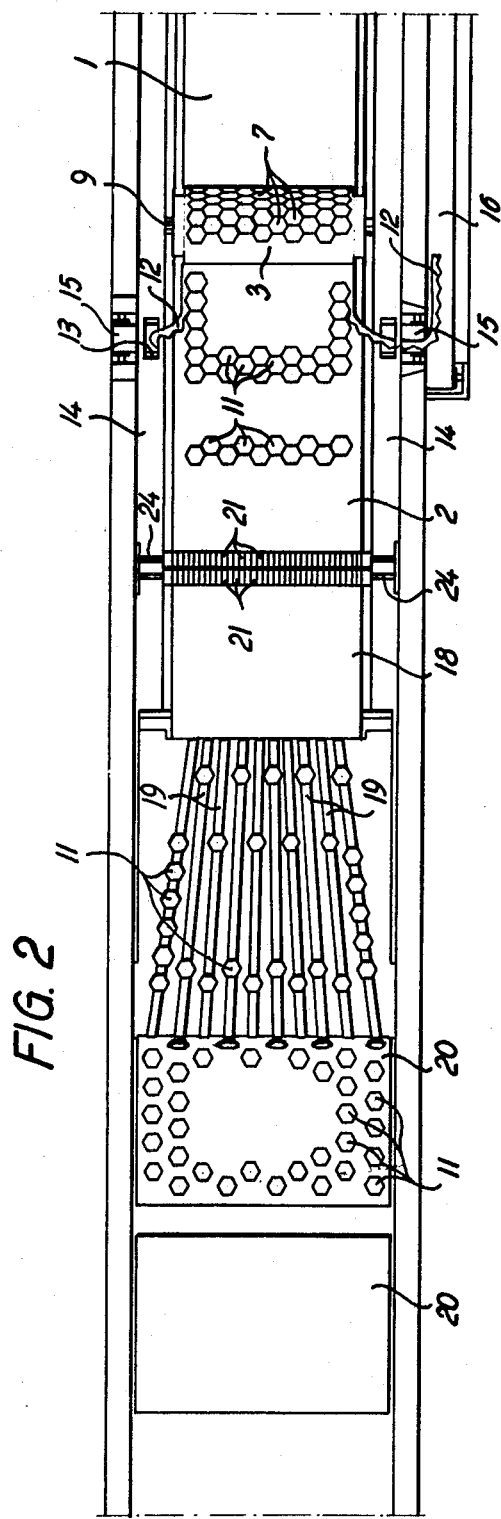
FIG. 1
FIG. 2

FIG. 7
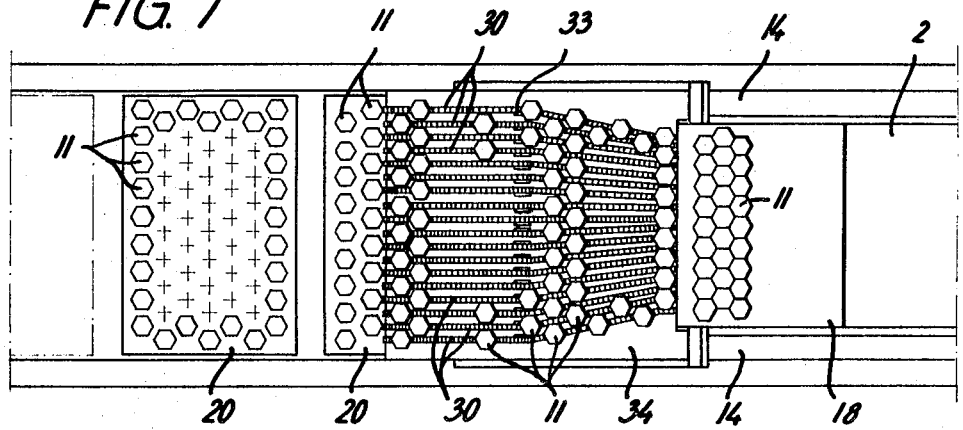
FIG. 8
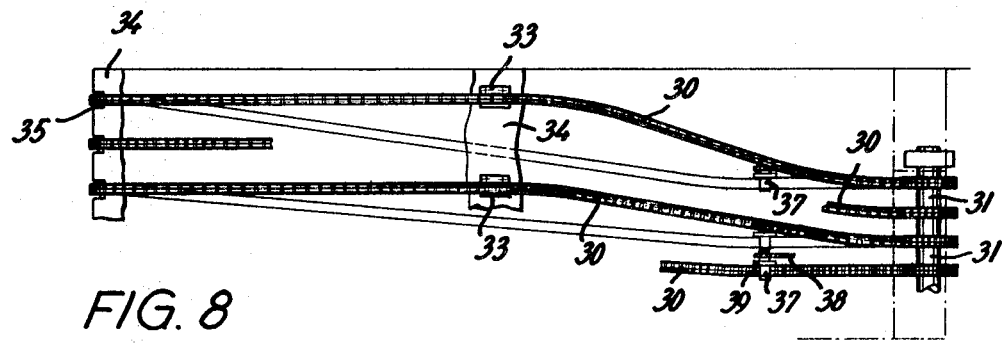
FIG. 9
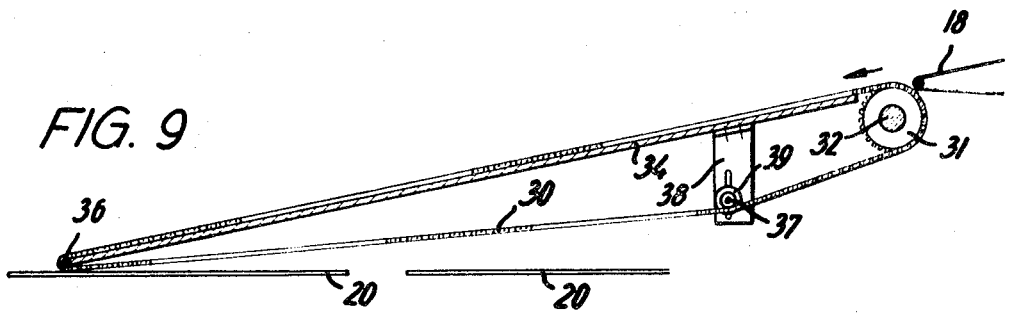
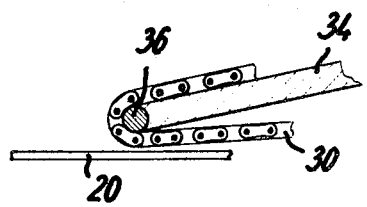
FIG. 10

APPARATUS FOR PREPARING DOUGH PIECES IN SPACED RELATIONSHIP FOR BAKING

BACKGROUND OF THE INVENTION

This invention relates to a method of and apparatus for preparing pieces of soft yeast dough for subsequent baking. The invention is particularly, but not exclusively, concerned with the art of making-so-called hamburger or frankfurter buns, i.e. buns of substantially circular or elongated shape which may be split in two halves between which a hamburger or a frankfurter sausage is placed.

The prior art of making such dough pieces comprises dispensing a relatively fluid dough into recesses or molds in a baking pan which recesses have the shape of the finished bun, i.e. they are either circular in plan view or elongated with rounded ends. When all recesses in a pan have been filled the pan is conveyed through a so-called proofer which comprises a heater chamber in which the dough is proofed or rised, and from there through a baking oven. In particular with round buns this implies a poor utilization of the area of the baking pans and consequently a reduced production rate or capacity of the baking plant including the proofer and baking oven. The capacity is further reduced by the necessity of feeding the baking pans intermittingly or stepwise below the nozzles through the dough is dispensed in metered quantities.

BRIEF SUMMARY OF THE INVENTION

According to the present invention a method of forming pieces of soft yeast dough for subsequent baking comprises the step of piercing a band of dough to form a plurality of substantially contiguous hexagonal pieces, while said band is advanced in parallel to but spaced abovea baking pan, continuing the advancing movement of said dough pieces at an increased speed and superposing a lateral motion on at least some of said dough pieces to effect longitudinal and lateral spacing therebetween, and transferring said spaced dough pieces to a baking pan.

The invention also provides apparatus for preparing pieces of soft year dough for subsequent baking, comprising first conveyor means extending longitudinally of the apparatus, means for supplying a dough band to one end of said first conveyor means for feeding said dough band in longitudinal direction thereof, a punching tool located above said first conveyor means and having protruding punching means arranged in a polygonal pattern on a surface of said tool, and means for urging said punching tool towards said first conveyor means to cause said punching means to pierce said dough band and form therefrom a plurality of polygonal dough pieces, second conveyor means comprising a plurality of individual conveyors spaced in the later direction of the apparatus and extending from a discharge end of said first conveyor means in a fan-shaped configuration substantially symmetrical with respect to the longitudinal direction of said first conveyor means, third conveyor means located below said first and second conveyor means and arranged for feeding baking pans in succession to and past a discharge end of said second conveyor means, and means for driving said conveyor means in timed relationship.

An important advantage of the present invention is that it enables an increase of the capacity or production rage of a given baking plant because the area of each baking pan may be utilized to a maximum extent due to the stamping or punching of contiguous dough pieces from a dough band and the subsequent spreading of the pieces in the lateral and longitudinal directions of each pan. The spreading may be effected so that the spacing of the dough pieces when the pans are transferred from the final conveyor to the proofer, is just sufficient to allow for the subsequent growth of the buns due to the rising and baking so that after being baked they do not stick together to any substantial extent. It is possible to advance or feed the baking pans continuously and to transfer dough pieces continuously to each successive pan. Since there will normally be some spacing of the pans on the associated conveyor it is only necessary to interrupt the feeding of the dough band and the punching of the dough pieces for short intervals corresponding to the spacing between the baking pans. It has been found in practical that with a suitable dough formula and consistency of the dough band the corners of the polygonal dough pieces will be smoothed out during the proofing and baking stages so that a bun of approximately circular shape may be obtained from a dough piece originally punched out with a regular hexagonal contour.

The invention will now be described in more detail with reference to the accompanying drawings which illustrate a preferred embodiment of the invention and some modifications thereof.

BRIEF DESCRIPTION OF THE DRAWINGS

FIG. 1 is a diagrammatical longitudinal section through an apparatus embodying the present invention, whereby only the components of the apparatus necessary for understanding the invention are shown for the sake of clarity, FIG. 2 is a plan view of FIG. 1 in the direction of arrow II, FIG. 7 is a plan view of a modified embodiment and showing only the central portion of the apparatus, FIG. 8 is a fragmentary plan view of the apparatus of FIG. 7 illustrating the fan-shaped configuration of the conveyors for transferring dough pieces to the baking pans, on a larger scale than FIG. 7, FIG. 9 is a vertical section of FIG. 8 showing a single conveyor and associated parts of the apparatus, and FIG. 10 is a fragmentary view of the discharge end of the conveyor shown in FIG. 9, on a larger scale.

DESCRIPTION OF FIRST EMBODIMENT

Figure 3:
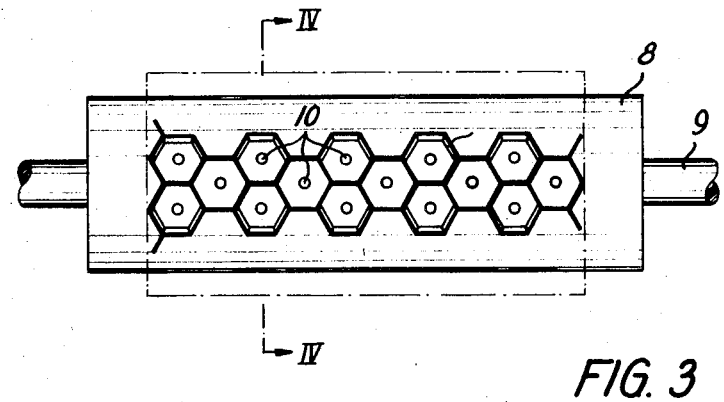
FIG. 3 is a plan view on a larger scale showing a punching or pattern roller which can be used in the apparatus of FIGS. 1 and 2, whereby certain elements have been omitted for the sake of clarity.

FIGS. 1 and 2 diagrammatically illustrate the discharge end of a machine for preparing dough pieces which machine includes an apparatus according to the present invention. The dough pieces discharged from the machine are subsequently subjected to a rising or proofing operation and are then baked to form substantially round buns, e.g. the so-called hamburger buns mentioned above. Since the proofing and baking step and the apparatus therefor is commonly known in the art is not deemed necessary to shown them in the present description. The machine comprises a portion, not shown, which in FIGS. 1 and 2 will be located to the right of the components shown. In this part of the machine there is produced a coherent broad dough band 1 of a yeast dough having a suitable consistency. The thickness or vertical height of the band may be controlled by means of rollers not shown and known per se. The dough band 1 is advanced towards the left in FIGS. 1 and 2 by means of the conveyor band 2 trained over various guide rollers of which at least one is driven in order to drive the conveyor band. Furthermore, at least one roller may be adjustable or movable in order to maintain a suitable tension of the conveyor band.

The active strand of the conveyor 2 which serves for advancing the dough band 1, extends substantially horizontally through the machine, and above this part or strand of the conveyor band there is provided a rotatable punching or pattern roller 3 which cooperates with a backing roller 4 located below the conveyor band 2. The roller 3 may be driven in synchronism with the advancing of the dough band 1 but if desired it may simply be rotatably supported in frame elements 5 so that the rotation of the roller is effected from the conveyor band 2 with which the roller is in engagement. In the operative position of the roller 3, the weight of the roller causes it to engage the band 2 so that the pattern strips 7 which are described below and which protrude from the surface of roller 3, pierce or cut through the dough band 1 and divides the band into a plurality of polygonal pieces when the dough band passes below the roller. From the operative position illustrated in FIG. 1 the roller 3 may be lifted to an operative position by means of a handle 6 which is operatively connected to the bearings or supports of the roller via an eccentric or the like mechanism known in the art.

Figure 4:
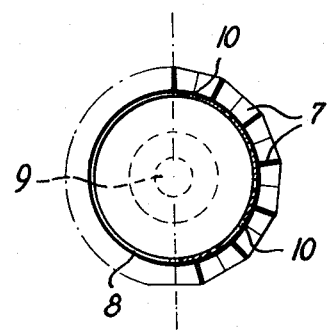
FIG. 4 is a section on line IV–IV in FIG. 3.

The above-mentioned strips 7 on the surface of roller 3 form a honeycomb pattern having regular hexagonal openings between the strips, as also shown in FIGS. 3 and 4. The strips 7 may be secured to the surface of the roller body 8 by means of welding, brazing or in any other suitable way. The roller body 8 may be formed from a tube which at both ends is secured to a shaft 9 journaled in the frame members or elements 5 mentioned above. In the bottom of each of the hexagonal cells formed between the strips 7 there is an aperture 10 extending through the wall of the tubular body 8 to the interior of the body.

When the punching or pattern roller 3 rolls in engagement with the dough band 1 advancing between the roller and the conveyor band 2, the outer edges of the strips 7 cut the dough band into individual pieces 11 having the same regular hexagonal contour as the cells in the roller surface. It is possible to shape the strips 7 so that there will be no waste of dough between the individual pieces 11 which only are slightly compressed at their edges when the strips pierce the dough band 1. At the two longitudinal edges of the dough band 1 the outermost strips 7 produce narrow ribbons 12 which may be removed from the conveyor band 2 through apertures 13 in the longitudinal members 14 of the machine frame. Through the apertures 13 the dough ribbons 12 fall down upon a transverse conveyor 15 which transport them to a further conveyor 16 located along one side of the machine frame. From the conveyor 16 the dough ribbons may be conveyed back to the feed hopper of the dough band machine or to the dough kneading apparatus not shown, in which the dough is prepared. In order to facilitate the removal of the dough ribbons 12 there may be provided a nozzle 17, see FIG. 1, above each frame member 14, said nozzles being arranged for discharging pressurized air downwardly towards the dough band.

Downstream of the horizontal conveyor band there is provided an inclined conveyor band 18 with associated driving and tensioning rollers and at the discharge end of conveyor band 18 there is provided a plurality of synchronously driven separate conveyors 19 for transferring the dough pieces 11 to baking pans 20 which are advanced horizontally below the conveyors 19. As shown in FIG. 2 the conveyors 19 are arranged in a fan-shaped configuration and there are 10 conveyors 19 corresponding to the number of dough pieces 11 formed in each zigzag shaped transverse row by the punching action of roller 3. Where the conveyors 2 and 18 join each other there are provided two smoothing rollers cooperating with the conveyor bands and each consisting of a plurality of rings 21 freely supported by a shaft 24. The diameter of shafts 24 is smaller than the bore of the rings 21 so that the weight of the rings keep them in engagement with the upper surface of the dough pieces 11 for smoothing out smaller irregularities in the thickness or height of the dough pieces.

The baking pans 20 are advanced below the conveyor means 2, 18 and 19 by means of a diagrammatically shown chain conveyor 22 which may comprise two chains each arranged adjacent one longitudinal edge of the machine. The chains carry drivers 23 for engaging the rear or trailing edge of each baking pan 20.

The conveyor 22 and the baking pans 20 may be advanced continuously while the conveyor band 2 and hence the dough band 1 are advanced intermittently in steps each corresponding in length to the punching out of the number of dough pieces 11 to be transferred to each baking pan 20. The conveyor band 2 and the roller 3 will be stationary in short intervals corresponding to the spacing between the individual baking pans 20 on the conveyor 22. The conveyor band 18 may be driven continuously so that when the dough pieces 11 are transferred from conveyor band 2 to the band 18 there is effected a spacing between the individual groups of pieces each corresponding to one baking pan 20. When the bands 2 and 18 are driven at the same linear speed there will be no separation of the individual pieces 11 belonging to one of said groups when the pieces are transported on band 18. Such separation or spacing is obtained by means of the conveyors 19 which may be driven continuously at the same speed as conveyor 22 which speed exceeds the speed of bands 2 and 18. Due to the differential speed the successive pieces 11 on the conveyors 19 will be spread or separated in the longitudinal direction as illustrated in FIG. 2 in which several pieces have been omitted for the sake of clarity. The arrangement of conveyors 19 in a fan shaped configuration provides for a simultaneous spreading or spacing of the pieces in the transverse direction so that the pieces are finally deposited on the baking pans 20 with a suitable mutual spacing in the longitudinal and the transverse direction. It is expedient to choose the spacing so that a maximum utilization of the area of baking pan 20 is obtained with due consideration of the fact that during the subsequent rising or proofing operation the dough pieces rise or grow whereby the spacing between the pieces decreases.

Figure 5:
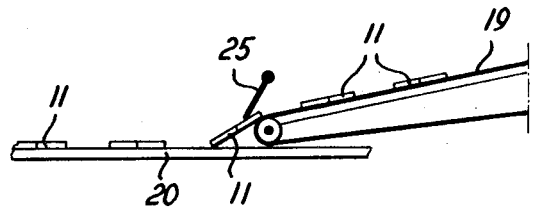
FIG. 5 is a fragmentary view, in vertical section, of the apparatus of FIG. 1 on a larger scale.

Since there must be a certain vertical spacing between the discharge ends of conveyors 19 and the baking pans 20, a freely pivoting finger 25 may be disposed at the discharge end of each conveyor 19, see FIGS. 1 and 5. Under the influence of its weight each finger engages the dough pieces 11 and thereby prevents the dough piece from tilting when it drops down under a baking pan 20. These fingers 25 may be omitted in the embodiment shown in FIGS. 7—10 in which the punching strips on the punching or pattern roller are arranged so that the dough pieces are punched out with an apex or a corner pointing forward in the feeding direction.

Figure 6:
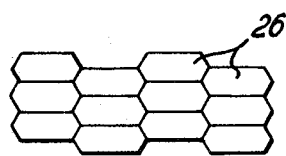
FIG. 6 is a plan view of dough pieces which can be prepared in the apparatus with a modified pattern or punching roller.

FIG. 6 illustrates a slightly modified shape of the dough pieces 26 which are more elongated than the dough pieces 11. It is also possible to modify the pattern of the punching means to produce e.g. rectangular (square or elongated) dough pieces. It has been found in practice that the hexagonal form of the dough pieces disclosed above, especially the regular form having corner angles of wholly or substantially 120°, will be partly smoothed out during the proofing and baking of the buns due to a contraction of the dough at the corners. Consequently it is possible to produce approximately circular buns from dough pieces of regular hexagonal form, and correspondingly, the elongated dough pieces illustrated in FIG. 6 will become rounded at their ends when they are baked, thereby providing frankfurter buns of normal appearance.

DESCRIPTION OF MODIFIED EMBODIMENT

The apparatus illustrated in FIGS. 7—10 may generally be constructed as that shown in FIGS. 1—5, and identical parts are designated by the same reference numerals. Such parts include the longitudinal frame members 14 of the frame which otherwise is not shown in details, the primary conveyor band 2 for advancing the dough band (not shown) and the subsequent conveyor band 18 from which the dough pieces 11 are transferred to the baking pans 20 via individual conveyor means. The punching or pattern roller not shown in FIGS. 7—10 may have projecting strips like those shown in FIGS. 3 and 4 but turned 30°, as already mentioned above, so that the dough pieces 11 have one of their corners pointing in the longitudinal or conveying direction as clearly shown in FIG. 7.

The conveyor means connecting band 18 with the conveyor not shown for feeding the baking pan 20, comprise a plurality of narrow conveyor chains 30 which directly support the dough pieces 11 on their upper edges. As shown, all conveyors are driven in unison from sprockets 31 secured to a common shaft 32 extending transversely of the machine and driven from a suitable motor, not shown. From the respective sprockets 31 the upper or active strand of each chain 30 extends first in the longitudinal direction, as seen in FIG. 8, and it is then deflected laterally towards the longitudinal edge of the machine. This deflection which is very small or even nil at the central chain or chains, increases progressively in respect of the chains remote from the longitudinal center line and assumes a maximum value for the two outermost chains. The deflection is ensured by means of small angular guide plates 33 which are secured to a supporting plate or table 34 with an upstanding lug engaging the respective chain 30 on the side thereof facing against the centerline.

As shown, the table 34 extends substantially for the entire length of the active upper strand of the chains 30 and at its lower end the table has a plurality of recesses 35, one for each chain 30. In the bottom of each recess 35 there may be welded a short rod 36 of a suitable hard material, e.g. a steel alloy, over which the respective chain 30 is trained. With a suitable hardness of the material of the rods 36 their diameter may be rather small without involving excessive friction and wear upon the rods or chains so that the dough pieces only drop through a small vertical height when being transferred from the chains 30 to the baking pans 20, see FIG. 10.

From the associated guide rod 36 the lower strand of each chain 30 extends over a roller 37 back to the associated sprocket 31. Each roller 37 is individually journaled in a bracket 38 secured to the lower side of the table 34 and the roller is vertically adjustable with respect to the bracket so that the tension in the chain 30 can be kept at a suitable value. Each roller 37 is provided with a flange 39 which engages the chain 30 laterally to take up the lateral forces resulting from the deflection of the chain. MISCELLANEOUS The following is a formula for a yeast dough suitable for carrying out the method of the present invention. This dough is relatively soft but not so soft or fluid as the dough used in the prior art in which the dough is dispensed into molds or recesses in the baking pans.

50 lbs. flour
26 lbs. water
2.5 lbs. yeast
3.0 lbs. sugar
1.0 lb. milk-powder (dried milk)
0.2 lb. salt
appr. 4.5 lbs. fat
0.3 lb. Molagen (mould preventing agent)

The dough according to this formula contains approximately 57 percent flour. After mixing the dough will normally rest approximately 40 minutes before it is supplied to the machine. The proofing time will be approximately 60 minutes and the baking time 8—10 minutes at a temperature of approximate 230° c.

The rotary described above for punching or piercing out the dough pieces may be replaced by a flat punching tool having corresponding projections or strips combined with means for lowering and lifting the punch relative to the dough band in timed relationship with the feeding of the dough band. In that case the total number of dough pieces which later will be transferred to a baking pan, can be punched out in one operation. It is not necessary that all "cells" in the punching tools are identical and the punching tool may e.g. comprise a plurality of regular octagons with intervening squares. After proofing and baking the octagonal dough pieces would even better approximate the circular shape as the hexagonal pieces described above whereas the square dough pieces would substantially conserve their shape obtained by the punching operation.

In addition to the advantages mentioned above it is noted that when the dough pieces are punched out directly from a flat dough band the finished buns will be substantially flat also on their upper side which is appreciated by the consumers as more convenient than a domed upper surface.

It is to be understood that while the individual conveyors for transferring the dough pieces to the baking pans are shown as narrow conveyor bands in the embodiment of FIGS. 1 and 2 they may alternatively comprises conveyor chains as shown in FIGS. 7—10. Since the necessary lateral deflection of the chains is relatively small it will normally be possibly to use standard chains, either simplex or duplex dependent on the chain pitch, the size of the dough pieces etc.

I claim:

1. Apparatus for preparing pieces of soft yeast dough for subsequent baking, comprising first conveyor means extending longitudinally of the apparatus, means for supplying a dough band to one end of said first conveyor means for feeding said dough band in the longitudinal direction thereof, a punching tool located above said first conveyor means and having protruding punching means arranged in a polygonal pattern on a surface of said tool, means for urging said punching tool towards said first conveyor means to cause said punching means to pierce said dough band and form therefrom a plurality of polygonal dough pieces, second conveyor means comprising a plurality of individual conveyors spaced in the lateral direction of the apparatus and extending from a discharge end of said first conveyor means in a fan-shaped configuration substantially symmetrical with respect to the longitudinal direction of said first conveyor means, third conveyor means located below said first and second conveyor means and arranged for feeding baking pans in succession to and past a discharge end of said second conveyor means, means for driving said first conveyor means intermittently, means for driving said second conveyor means continuously at a higher speed than said first conveyor means, and means for driving said third conveyor means continuously at substantially the same linear speed as aid second conveyor means.

2. Apparatus as claimed in claim 1, wherein the individual conveyors of said second conveyor means are chains each having an active upper strand for supporting said dough pieces and a lower return strand, and further comprising a table supporting the active upper strands of said conveyor chains, and means for guiding each chain in a path which at least adjacent the discharge end thereof is substantially parallel to the longitudinal direction of said first and third conveyor means, said guide means comprising upstanding tabs secured to the upper surface of said table and each engaging laterally with one of said chains.